(12) United States Patent
Singh et al.

(10) Patent No.: US 8,498,487 B2
(45) Date of Patent: Jul. 30, 2013

(54) CONTENT-BASED MATCHING OF VIDEOS USING LOCAL SPATIO-TEMPORAL FINGERPRINTS

(75) Inventors: Gajinder Singh, Noida (IN); Manika Puri, Princeton, NJ (US); Jeffrey Lubin, Princeton, NJ (US); Harpreet Singh Sawhney, Princeton, NJ (US)

(73) Assignee: SRI International, Menlo Park, CA (US)

( * ) Notice: Subject to any disclaimer, the term of this patent is extended or adjusted under 35 U.S.C. 154(b) by 638 days.

(21) Appl. No.: 12/262,463

(22) Filed: Oct. 31, 2008

(65) Prior Publication Data

US 2010/0049711 A1   Feb. 25, 2010

Related U.S. Application Data

(60) Provisional application No. 61/090,251, filed on Aug. 20, 2008.

(51) Int. Cl.
*G06K 9/50* (2006.01)
(52) U.S. Cl.
USPC .................... 382/201; 382/124; 707/999.006
(58) Field of Classification Search
USPC ....... 382/181, 190, 201, 218, 224, 245; 707/6
See application file for complete search history.

(56) References Cited

U.S. PATENT DOCUMENTS

| | | | |
|---|---|---|---|
| 7,336,841 B2 * | 2/2008 | Neogi | 382/245 |
| 7,634,147 B2 * | 12/2009 | Neogi | 382/245 |
| 8,009,861 B2 * | 8/2011 | Lu et al. | 382/100 |
| 8,094,872 B1 * | 1/2012 | Yagnik et al. | 382/100 |
| 8,144,947 B2 * | 3/2012 | Kletter | 382/124 |

(Continued)

OTHER PUBLICATIONS

Chih-Yi Chiu et al, "Efficient and Effectvie Video Copy Detection Based on Spatiotemporal Analysis", Dec. 10-12, 2007, Ninth IEEE International Symposium on Multimedia, pp. 202-209.*

(Continued)

*Primary Examiner* — Gregory M Desire
(74) *Attorney, Agent, or Firm* — Moser Taboada

(57) ABSTRACT

A computer implemented method computer implemented method for deriving a fingerprint from video data is disclosed, comprising the steps of receiving a plurality of frames from the video data; selecting at least one key frame from the plurality of frames, the at least one key frame being selected from two consecutive frames of the plurality of frames that exhibiting a maximal cumulative difference in at least one spatial feature of the two consecutive frames; detecting at least one 3D spatio-temporal feature within the at least one key frame; and encoding a spatio-temporal fingerprint based on mean luminance of the at least one 3D spatio-temporal feature. The least one spatial feature can be intensity. The at least one 3D spatio-temporal feature can be at least one Maximally Stable Volume (MSV). Also disclosed is a method for matching video data to a database containing a plurality of video fingerprints of the type described above, comprising the steps of calculating at least one fingerprint representing at least one query frame from the video data; indexing into the database using the at least one calculated fingerprint to find a set of candidate fingerprints; applying a score to each of the candidate fingerprints; selecting a subset of candidate fingerprints as proposed frames by rank ordering the candidate fingerprints; and attempting to match at least one fingerprint of at least one proposed frame based on a comparison of gradient-based descriptors associated with the at least one query frame and the at least one proposed frame.

15 Claims, 9 Drawing Sheets

U.S. PATENT DOCUMENTS

| | | | |
|---|---|---|---|
| 8,204,314 B2 * | 6/2012 | Lu et al. | 382/218 |
| 8,229,227 B2 * | 7/2012 | Stojancic et al. | 382/190 |
| 8,259,177 B2 * | 9/2012 | Gits et al. | 348/169 |
| 2009/0154806 A1 * | 6/2009 | Chang et al. | 382/173 |
| 2009/0292701 A1 * | 11/2009 | Saoudi et al. | 707/6 |
| 2009/0324199 A1 * | 12/2009 | Haitsma et al. | 386/95 |
| 2010/0049711 A1 * | 2/2010 | Singh et al. | 707/6 |
| 2011/0007932 A1 * | 1/2011 | Zhang | 382/100 |

OTHER PUBLICATIONS

Donoser et al, "3D Segmentation by Maximally Stable Volumes", 2006, Proceeding of the 18th International Conference on Pattern Recognition—vol. 1, pp. 63-66.*

Sivic, J., and Zisserman, A., "Video google: A text retrieval approach to object matching in videos," ICCV 2, 1-8 (2003).

Matas, J., Chum, O., Martin, U., Pajdla, T., "Robust wide baseline stereo from maximally stable extremal regions," BMVC 1, 384-393 (2002).

Nister, D., and Stewenius, H., "Scalable recognition with a vocabulary tree," CVPR 2, 2161-2168 (2006).

Massoudi, A., Lefebvre, F., Demarty, C.-H., Oisel, L., and Chupeau, B., "A video fingerprint based on visual digest and local fingerprints," ICIP, 2297-2300 (2006).

Donoser, M., Bischof, H., "3D segmentation by maximally stable vols. (MSVs)," ICPR, 63-66 (2006).

* cited by examiner

CONTENT-BASED MATCHING OF VIDEOS USING LOCAL SPATIO-TEMPORAL FINGERPRINTS

CROSS-REFERENCE TO RELATED APPLICATIONS

This application claims the benefit of U.S. provisional patent application No. 61/090,251 filed Aug. 20, 2008, the disclosure of which is incorporated herein by reference in its entirety.

FIELD OF THE INVENTION

The present invention relates generally to vision systems, and more particularly to a method and system for matching a video clip to one of a plurality of stored videos using a "fingerprint" derived from the video clip.

BACKGROUND OF THE INVENTION

There are many applications where it would be desirable to identify a full length video that is resident in a large database or distributed over a network such as the Internet using only a short video clip. One such application involves the identification and removal of innumerable illegal copies of copyrighted video content that reside in popular video-sharing websites and peer-to-peer (P2P) networks on the Internet. It would be desirable to have a robust content-identification system that detects and removes copyright infringing, perceptually identical video content from the databases of such websites and prevent any future uploads made by users of these web sites.

A computer vision technique that meets the goals of such an application is called video fingerprinting. Video fingerprinting offers a solution to query and identify short video segments from a large multimedia repository using a set of discriminative features. What is meant by the term fingerprint is a signature having the following properties:

1) Fingerprints must be small in dimension and capture all perceptually important video-related information crucial for identifying it.
2) Fingerprints of two different videos must also be significantly different.
3) Matching two fingerprints should be enough to declare the corresponding videos as being the same.

Practical video fingerprinting techniques need to meet accuracy and speed requirements. With regard to accuracy, it is desirable for a querying video clip to be able to identify content in the presence of common distortions. Such distortions include blurring, resizing, changes in source frame rates and bit rates, changes in video formats, resolution, illumination settings, color schemes letterboxing, and frame cropping. With regard to speed, a video fingerprinting technique should determine a content-match with a small turn-around time, which is crucial for real-time applications. A common denominator of many fingerprinting techniques is their ability to capture and represent perceptually relevant multimedia content in the form of short robust hashes for fast retrieval.

In some existing content-based techniques known in the prior art, video signatures are computed employing features such as mean-luminance, centroid of gradient, rank-ordered image intensity distribution, and centroid of gradient orientations, over fixed-sized partitions of video frames. The limitation of employing such features is that they encode complete frame information and therefore fail to identify videos when presented with queries having partially cropped or scaled data. This motivates the use of a local fingerprinting approach.

In Sivic, J., and Zisserman, A., "Video google: A text retrieval approach to object matching in videos," ICCV 2, 1-8 (2003) (hereinafter "Sivic and Zisserman"), a text-retrieval approach for object recognition is described using of two-dimensional maximally stable external regions (MSERs), first proposed in Matas, J., Chum, O., Martin, U., Pajdla, T., "Robust wide baseline stereo from maximally stable external regions," BMVC 1, 384-393 (2002), as representations of each video frame. In summary, MSERs are image regions which are covariant to affine transformations of image intensities.

Since the method of Sivic and Zisserman clusters semantically similar content together in its visual vocabulary, it is expected to offer poor discrimination, or example, between different seasons of the same TV program having similar scene settings, camera capture positions and actors. A video fingerprinting system is expected to provide good discrimination between such videos.

Similar to Sivic and Zisserman, as described in Nister, D., and Stewenius, H., "Scalable recognition with a vocabulary tree," CVPR 2, 2161-2168 (2006) (hereinafter "Nister and Stewenius"), Nister and Stewenius propose an object recognition algorithm that extracts and stores MSERs based on a group of images of an object, captured under different viewpoint, orientation, scale and lighting conditions. During retrieval, a database image is scored depending on the number of MSER correspondences it shares with the given query image. Only the top scoring hits are then scanned further. Hence, fewer MSER pairs decrease the possibility of a database hit to figure out within the top ranked images.

Since a fingerprinting system needs to identify videos even when queried with short distorted clips, both Sivic and Zisserman and Nister and Stewenius become unsuitable, since strong degradations such as, blurring, cropping, frame-letterboxing, result in a fewer suitable MSERs found in a distorted image as compared to its original. Such degradations have a direct impact on the algorithm's performance because of a change in the representation of a frame.

In Massoudi, A., Lefebvre, F., Demarty, C.-H., Oisel, L., and Chupeau, B., "A video fingerprint based on visual digest and local fingerprints," ICIP, 2297-2300 (2006), (hereinafter "Massoudi et al."), Massoudi et al. proposes an algorithm that first slices a query video in terms of shots, extracts key-frames and then performs local fingerprinting. A major drawback of this approach is that even the most common forms of video processing such as blurring and scaling, disturb the key-frame and introduce misalignment between the query and database frames.

Accordingly, what would be desirable, but has not yet been provided, is a method and system for effectively and automatically matching a video clip to one of a plurality of stored videos using a fingerprint technique derived from the video clip that is fast and immune to common distortions.

SUMMARY OF THE INVENTION

The above-described problems are addressed and a technical solution is achieved in the art by providing a computer implemented method for deriving a fingerprint from video data, comprising the steps of receiving a plurality of frames from the video data; selecting at least one key frame from the plurality of frames, the at least one key frame being selected from two consecutive frames of the plurality of frames that exhibiting a maximal cumulative difference in at least one spatial feature of the two consecutive frames; detecting at least one 3D spatio-temporal feature within the at least one key frame; and encoding a spatio-temporal fingerprint based on mean luminance of the at least one 3D spatio-temporal feature. The least one spatial feature can be intensity. The at least one 3D spatio-temporal feature can be at least one Maximally Stable Volume (MSV). The at least one MSV is based on two dimensions of length and width of the key frame and the third dimension is resolution or time. The MSV is a volume that exhibits about a zero change in intensity for an incremental change in volume. The encoding step further comprises projecting the at least one MSV onto a circle whose center is selected as a reference center of the key frame.

The method can further comprise the step of storing at least the spatio-temporal fingerprint in a lookup table (LUT). The LUT associates with the at least the spatio-temporal fingerprint at least one MSV represented as an ellipse to achieve an affine invariant representation.

Also disclosed is a method for matching video data to a database containing a plurality of video fingerprints of the type described above, comprising the steps of calculating at least one fingerprint representing at least one query frame from the video data; indexing into the database using the at least one calculated fingerprint to find a set of candidate fingerprints; applying a score to each of the candidate fingerprints; selecting a subset of candidate fingerprints as proposed frames by rank ordering the candidate fingerprints; and attempting to match at least one fingerprint of at least one proposed frame based on a comparison of gradient-based descriptors associated with the at least one query frame and the at least one proposed frame. The at least one fingerprint representing at least one query frame and the plurality of video fingerprints are based on at least one Maximally Stable Volume (MSV) determined from at least one of the at least one query frame and the proposed frames and the mean luminance of the at least one MSV. The score is inversely proportional to the number of frames in the database having a matching fingerprint and directly proportional to the area of a frame represented by the fingerprint.

The step of merging the candidate fingerprints into a plurality of bins further comprises the step of placing candidate fingerprints into divisions of volumes of a 3D space constructed from the length and width of an area covered by the proposed frames, the third dimension of the 3D space being the frame number in a sequence of the proposed frames.

The step of selecting a subset of candidate fingerprints further comprises the steps of inverse transforming the transformed three points to frame of reference of the proposed frame: for each of the matching candidate fingerprints; computing the average inverse transformation of the bins that have the highest N accumulated scores; and rotating and translating a predetermined number of query frames (siftnum) to produce a series of frames that are aligned to the top ranked proposed frames that polled to the bins that have the highest N accumulated scores. The step of attempting to match at least one fingerprint further comprises the steps of calculating the Bhattacharyya distance between gradient-based descriptors of the aligned query frames and the top ranked proposed frames, and declaring a match to a proposed frame p if the Bhattacharyya distance is less than an empirically chosen predetermined threshold T, otherwise, declaring that no match is found.

The video associated with a matched proposed frame from one of the database containing a plurality of video fingerprints and a remote database. The remote database can be distributed over the Internet.

The gradient-based descriptors is based on a scale invariant feature transformation (SIFT).

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

Figure 1:
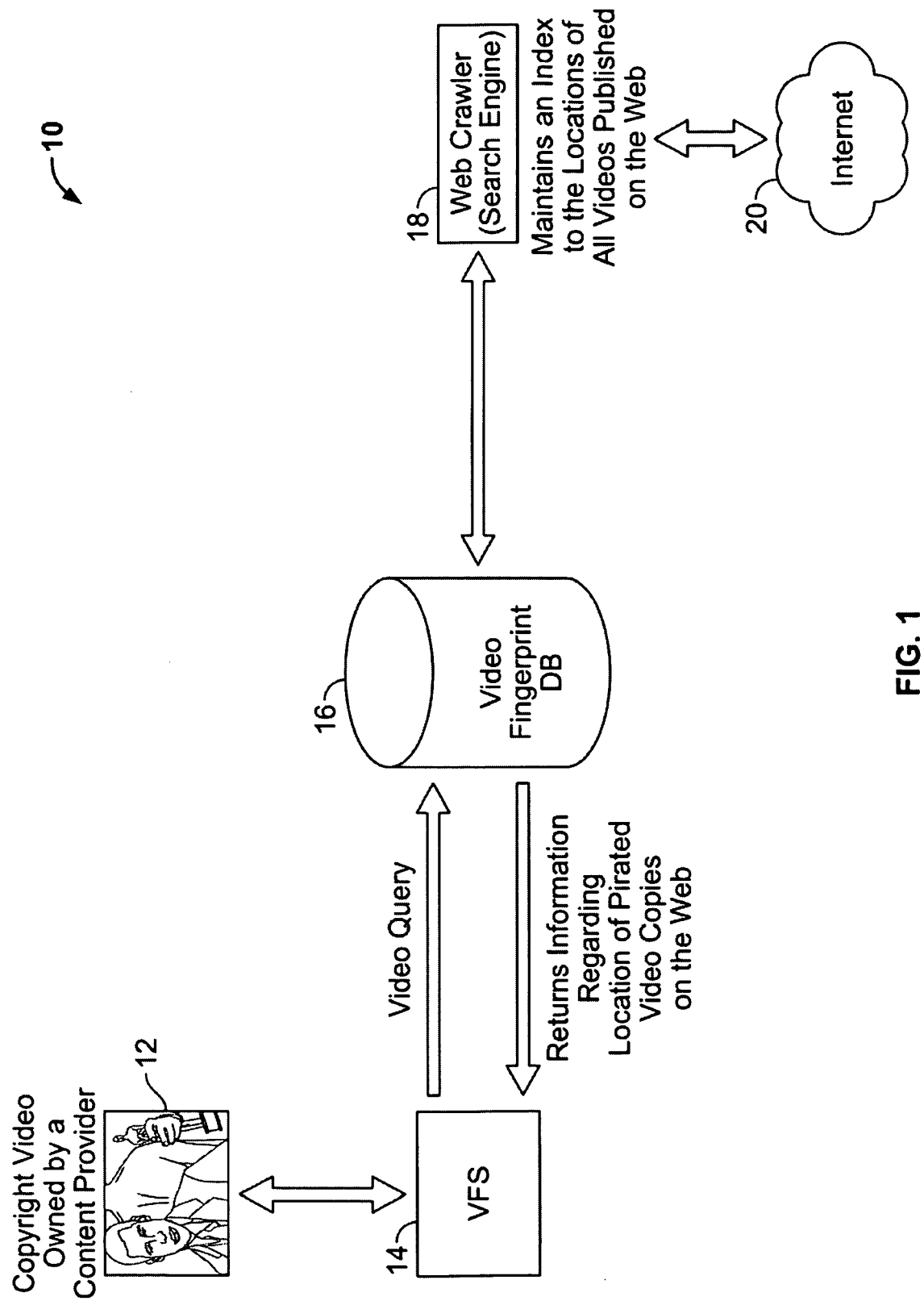
FIG. 1 is a block diagram of a hardware architecture for a system that employs video fingerprinting for combating video piracy on the Internet, constructed in accordance with an embodiment of the present invention.

Referring now to FIG. 1, a system that employs video fingerprinting for combating video piracy on the Internet is depicted, constructed in accordance with an embodiment of the present invention, and generally indicated at 10. The system 10 includes a copyright video or video segment 12, a video fingerprinting system 14, a video fingerprinting database 16, a web-crawler 18, and the Internet 20. The copyright video or video segment 12 is input from a digital video data stream or digital video recording device, such as a digital video camcorder, digital camera, cell phone, etc. to the video fingerprinting system 14, which calculates at least one fingerprint based on a plurality of frames in the copyright video or video segment 12. The calculated fingerprint and/or the copyright video or video segment 12 is used by the video fingerprinting system 14 to form a query of the video fingerprinting database 16. Keeping in mind the unprecedented video data present on the Internet 20 today, it is virtually impossible to store all the video data in the video fingerprinting database 16. Instead, the fingerprints of videos present on the Internet 20 at any given time are stored in the video fingerprint database 16. Further pruning can be made by storing only the fingerprints of videos owned by media producers in partnership. Still another method of pruning involves storing fingerprints of randomly selected sections of a video clip instead of the entire full-length clip. The video fingerprint database 16 is initially populated with fingerprints calculated by the video fingerprint system 14 working in conjunction with the web-crawler 18. The web-crawler (search engine) 18 maintains an index and provides links of all the locations on the web where videos have been published.

The system 10 of the present invention can combat video piracy by recognizing illegal copies of videos even when distorted in different ways, as enumerated above. Such video identification enables a user to recognize the presence of a pirated copy on the Internet 20 and consequently take steps to remove the illegal copy. In operation, the web-crawler 18 maintains a day-to-day list of videos published on the Internet 20. The query video sent by the video fingerprinting system 14 to the video fingerprinting database 16 is matched amongst the videos published on the Internet 20 for their possible candidature as illegal copies of the query. If a match is found, immediate steps to remove the clip from its location may be taken by the video fingerprinting system 14 as a consequence.

Figure 2:
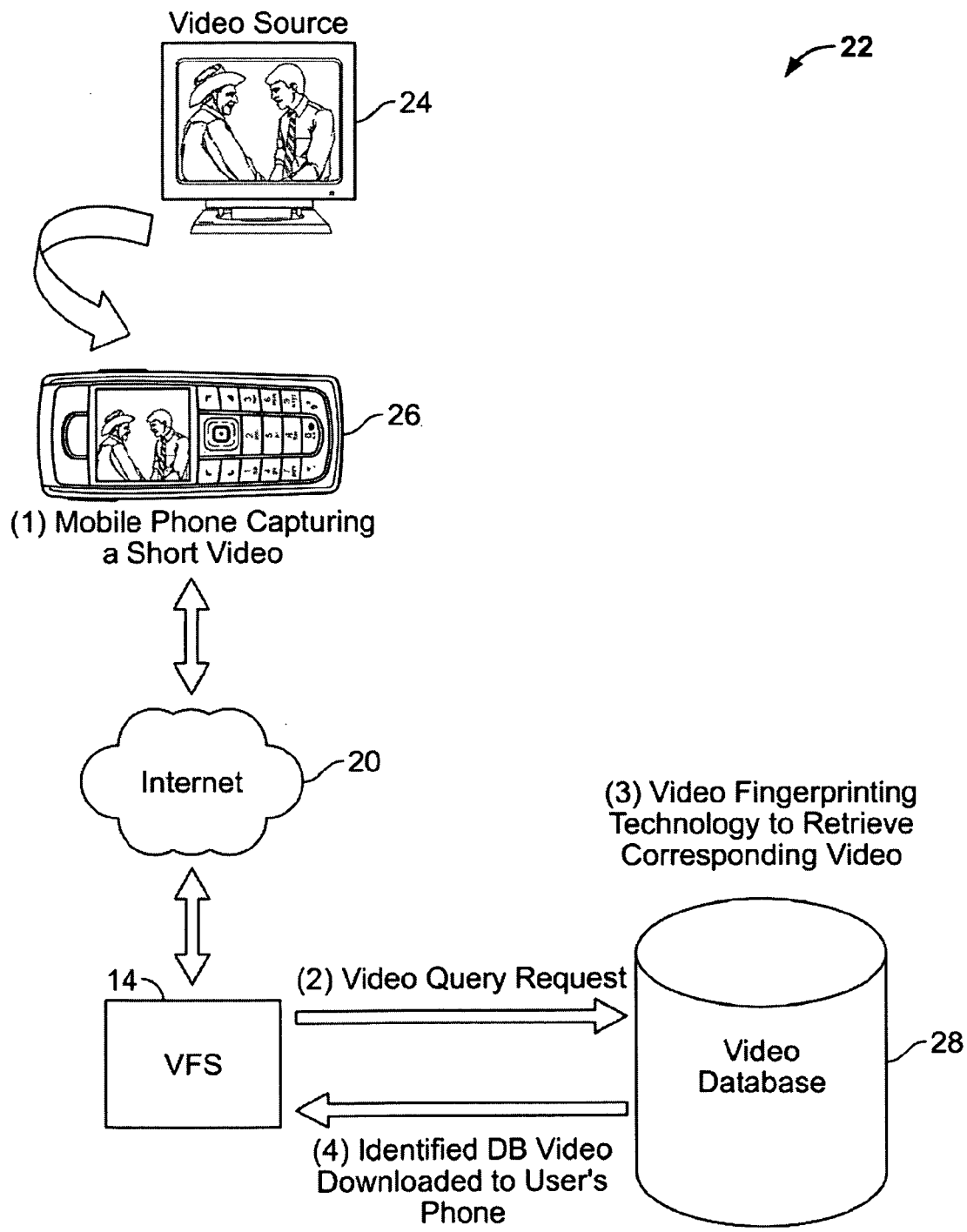
FIG. 2 is a block diagram of a hardware architecture for a system that employs video fingerprinting for downloading instant video for mobile phones, constructed in accordance with an embodiment of the present invention.

Referring now to FIG. 2, a system that employs video fingerprinting for downloading instant video for mobile phones is depicted, constructed in accordance with an embodiment of the present invention, and generally indicated at 22. The system 22 includes a video source 24, a video capturing device 26 such as a cell phone or camcorder, a video fingerprinting system 14, a database 28, and optionally, the Internet 20. In operation, a user recodes a short video segment of the displayed or projected video source (TV, laptop, movie screen, etc.) 24 using the video capturing device 26, which may be, for example, a cell phone camera. The video clip is input to the video fingerprinting system 14 by means of, for example, a cellular network which may work optionally in conjunction with the Internet 20, wherein at least one fingerprint is calculated based on a plurality of frames from the video clip. The video fingerprinting system 14 feeds the calculated at least one fingerprint and/or the video clip as a query or request for identification of the user-recorded video clip to the video repository represented by the database 28, which may be located at a video service company. The video fingerprinting system 14 attempts to match the video clip at least one fingerprint to one video fingerprint found in the database 28. Each of the fingerprints in the database 28 may be directly associated with a full length video stored in the database 28. If a match of fingerprints is found, the corresponding full length video is downloaded, for example, over the Internet 20 and/or the cellular system (not shown) to the user's video capturing device (cell phone) 26.

Figure 3:
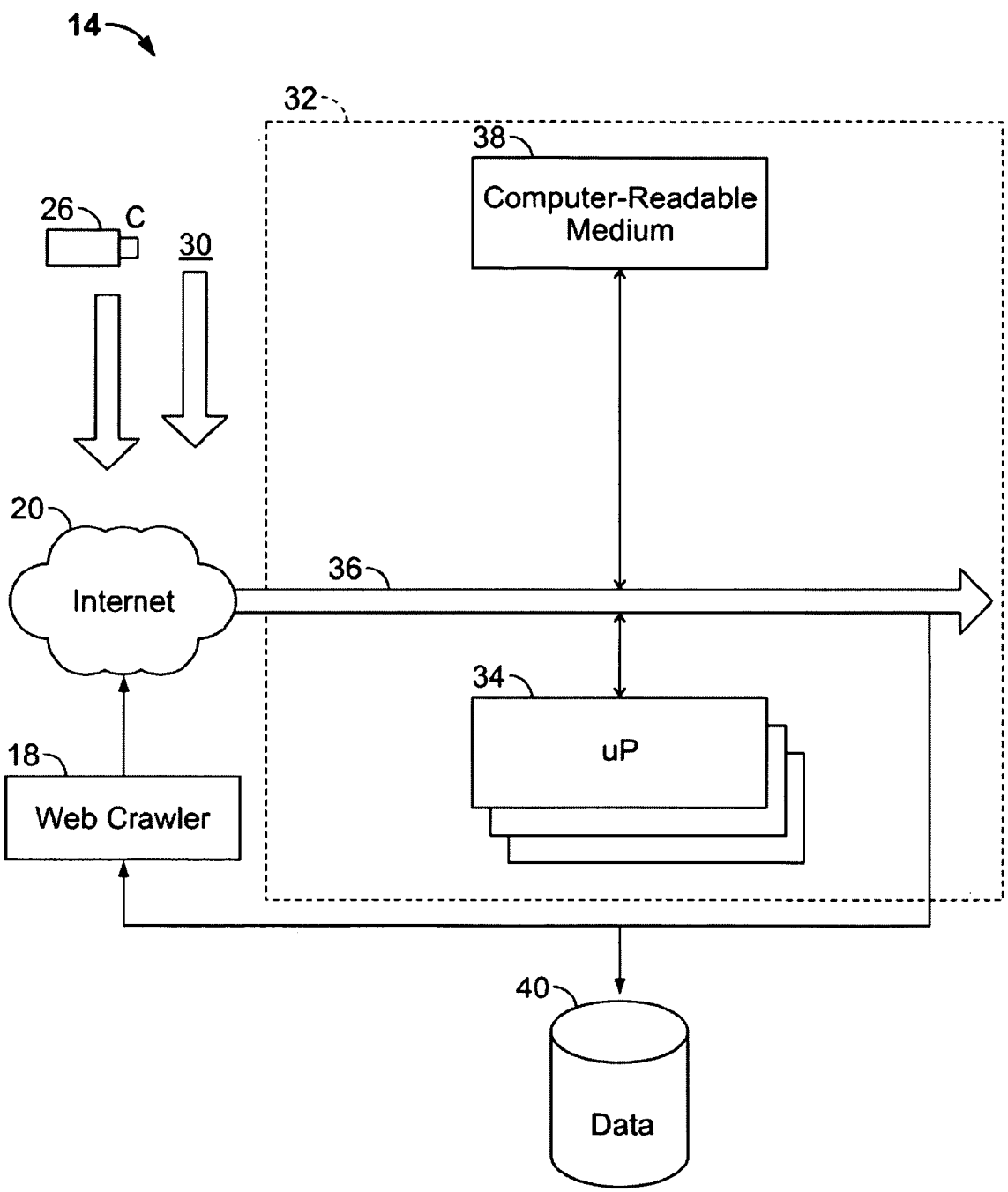
FIG. 3 is a block diagram of a hardware architecture which implements the video fingerprinting system employed in FIGS. 1 and 2, constructed in accordance with an embodiment of the present invention.

Referring now to FIG. 3, the video fingerprinting system 14 is depicted, constructed in accordance with an embodiment of the present invention. By way of a non-limiting example, the system 14 receives a digitized video datastream 30 via the Internet 20 or from a video capturing system 26. The system 14 can comprise a computing platform 32. The computing platform 32 may include a personal computer or work-station (e.g., a Pentium-M 1.8 GHz PC-104 or higher) comprising one or more processors 34 which includes a bus system 36 which is fed by the video data stream 30 via the one or more processors 34 or directly to a computer-readable medium 38.

The computer readable medium 38 can also be used for storing the instructions of the system 14 to be executed by the one or more processors 34, including an operating system, such as the Windows or the Linux operating system, one or more fingerprint methods of the present invention to be described hereinbelow, and optionally, a web-crawler program. The computer readable medium 38 can further be used for the storing and retrieval of fingerprints and associated video clips/full length videos in one or more databases. The computer readable medium 38 can include a combination of volatile memory, such as RAM memory, and non-volatile memory, such as flash memory, optical disk(s), and/or hard disk(s). Optionally, an external database server 40 can be used for queries and retrievals of videos and for access to an optional external web-crawler 18 which may be communicatively connected over a local area network or remotely via the Internet 20.

Figure 4:
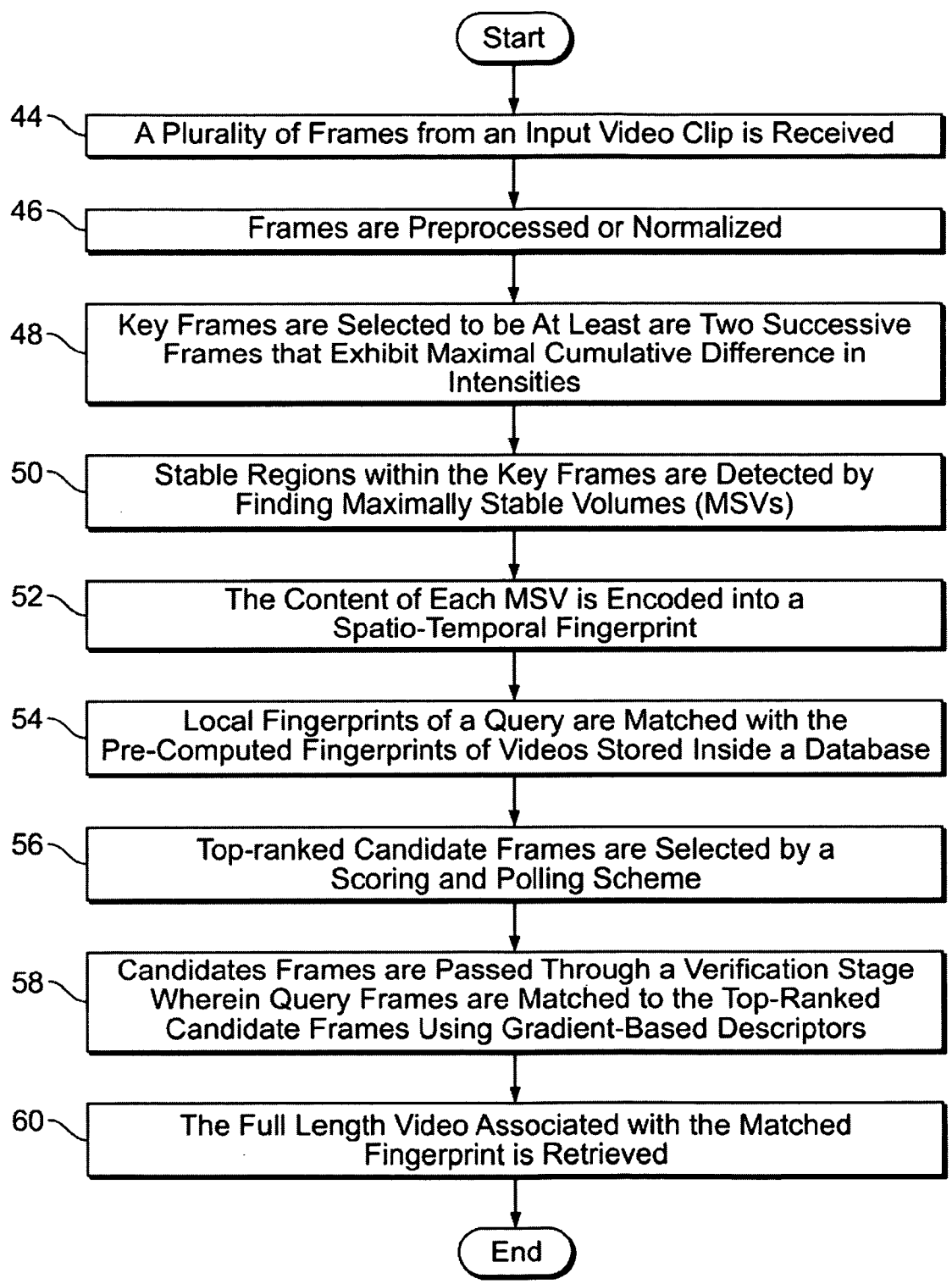
FIG. 4 is a flowchart of the steps of the computer implemented video fingerprinting method of the present invention configured to be executable by the video fingerprinting systems of FIGS. 1-3, constructed in accordance with an embodiment of the present invention.

Referring now to FIG. 4, there is shown a flowchart of the various stages of the proposed computer implemented video fingerprinting method of the present invention configured to be executable by the video fingerprinting system 14 of FIGS. 1-3, constructed in accordance with an embodiment of the present invention. At step 44, a plurality of frames from an input video clip is received. At step 46, these frames are preprocessed or normalized. Such preprocessing accrues the benefit of the processing algorithm being robust against changes in color formats or resizing and the benefit of increased speed for retrieval of large-size videos. At step 48, key frames of the video clip are selected to be at least are two successive frames in a video clip that exhibit maximal cumulative difference in intensities therebetween. Put another way, key frames are those frames in which the video exhibits a large amount of change. At step 50, stable regions within the key frames are detected by finding Maximally Stable Volumes (MSVs) to be described hereinbelow. To achieve an affine invariant representation for videos inside the database, at step 52, the content of each MSV is encoded into a spatiotemporal fingerprint, which captures the temporal variation of perceptually important features across the key frames. For database retrieval, at step 54, local fingerprints of a query are matched with the pre-computed fingerprints of videos stored inside the database. For the purpose of eliminating false database hits, at step 56, a scoring and polling scheme are applied to the matching candidate fingerprints, which are then passed at step 58 through a verification stage based on gradient-based descriptors for selecting the best-matched database video. Optionally, at step 60, the full length video associated with the matched fingerprint is retrieved from either the database where the fingerprints reside, or from a remote database, which may be located on the Internet.

For preprocessing step 46, the transformations to the plurality of frames can include changing the source frame rate to a predefined resampling rate (e.g., 10 fps), followed by converting each video frame to grayscale and finally, resizing all frames to a fixed width(w) and height(h) (e.g.,w=160 and h=120 pixels). The benefit of improvement in speed of the algorithm for retrieval of large-size videos is most sensitive to the appropriate selection of w and h.

Since videos contain a large amount of data, the present method minimizes storage requirements by selecting only a predetermined minimum number of key frames in step 48. Most frames contain redundant information, for few portions of each frame change in consecutive frames. Therefore, the selection of key frames from the plurality of frames can be based on detecting large changes in motion. A key frame can selected from two consecutive frames of a plurality of frames that exhibiting a maximal cumulative difference in at least one spatial feature of the two consecutive frames. The at least one spatial feature can be intensity. The frame sequence is examined to extract key-points that correspond to local peaks of maximum change in intensity. Since maximum change in intensity can reduce the stability of the regions detected in key-frames, a few neighboring frames on either side of the key-frames are also stored to maintain minimal database redundancy.

For further storage efficiency, instead of storing entire key frames, only small portions of the key frames are stored. The small are those that would be the most stable, i.e., those portions that would change the least when subjected to the aforementioned distortions. The selection of regions in key frames that are least sensitive to distortions is based on the concept of Maximally Stable Volumes (MSVs), proposed in Donser, M., Bischof, H., "3D segmentation by maximally stable volumes (MSVs)," ICPR, 63-66 (2006) for 3D segmentation. In any given frame, a region is represented in the two dimensions of length and width, which can be extended to a third dimension of resolution or time based on building Gaussian pyramids. Thus, each video frame is represented as a set of distinguished regions that are maximally stable to intensity perturbation over different scales.

The process of extracting MSVs is given formally as follows:

Image Sequence: For a video frame F, determine a set of multi-resolution images $F_1', F_2', \ldots, F_i', \ldots, F_s'$, where $F_i'$ is the video frame F downsampled $2^{i-1}$ and consequently upsampled to the same size as that of F.

Volume: For all pixel intensity levels i, connected volumes $V_j^i$ are defined as the $j^{th}$ volume such that all 3D points belonging to it have intensities less than (or greater than) i, $\forall (x,y,z) \epsilon V_j^i$ iff $F_z'(x,y) \leq i$ (or $F_z'(x,y) \geq i$. Thus, a 3D point (x,y,z) in this space corresponds to pixel (x,y) of frame F at resolution z or, equivalently $F_z(x,y)$.

Connectivity: Volume $V_j^i$ is said to be contiguous, if for all points $p,q \epsilon V_j^i$, there exists a sequence $p, a_1, a_2, \ldots, a_n, q$ and $pAa_1, a_1Aa_2, \ldots, a_iAa_{i+1}, \ldots, a_nAq$. Here A is an adjacency relation defined such that two pixels $p,q \epsilon V_j^i$ are adjacent (pAq) iff $$\sum_1^3 |p_i - q_i| \leq 1.$$

Partial Relationship: Any two volumes $V_k^i$ and $V_l^j$ are nested, i.e., $V_k^j \prec = V_l^j$ if $i \leq j$ (or $i \geq j$).

Maximally Stable Volumes: Let $V_1, V_2, \ldots, V_{i-1}, V_i, \ldots$ be a sequence of a partially ordered set of volumes, such that $V_i \prec = V_{i+1}$. External Volume v(i) is said to be maximally stable (i.e., an MSV) iff $v(i) = |V_{i+\Delta} \setminus V_{i-\Delta}|/|V_i|$ has a local minimum at i', i.e., for changes in intensity of magnitude less than $\Delta$, the corresponding change in region volume is zero.

Thus, each video frame is represented as a set of distinguished regions that are maximally stable to intensity perturbation over different scales. The reason for stability of MSVs over MSERs in most cases of image degradations is that additional volumetric information enables selection of regions with near-identical characteristics across different image resolutions. The more volatile regions (the ones which split or merge) are eliminated from consideration. Thus, detecting MSVs implies a reduction in the number of measurement regions per video frame, an important aspect for both decreased database storage as well as lower query retrieval times.

Figure 5:
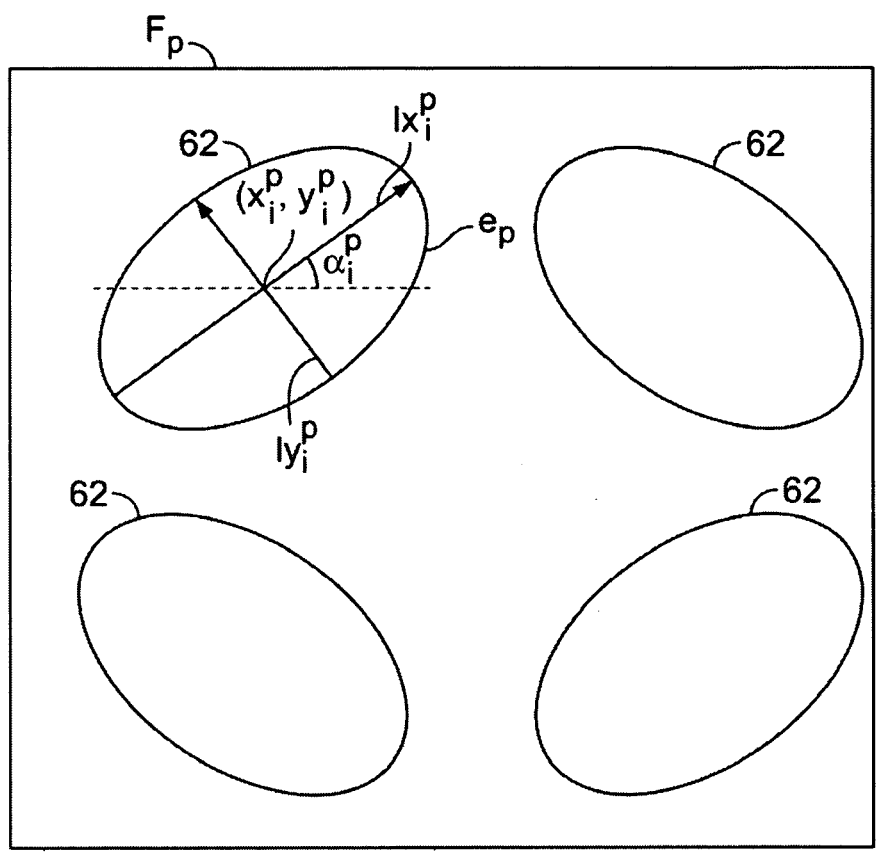
FIG. 5 is a geometric representation of Maximally Stable Volumes (MSVs) as elliptical projections over a frame/resolution onto regions of interest in a frame.

Referring now to FIG. 5, for a frame sequence $\{F_1, F_2, \ldots, F_p, \ldots\}$ where $F_p$ denotes the $p^{th}$ frame of the video clip, MSVs 62 can be represented as ellipses, i.e., the projections of the MSVs over frames/resolution onto the frames $F_p$. The representation of MSVs is in the form of an ellipse is known to those skilled in the art as being the shape that is highly invariant to affine transformations, and hence renders the MSVs 62 invariant to geometric distortions. In terms of the present notation, pixels of the $i^{th}$ maximally stable volume $V_i^p$ in frame $F_p$ are made to fit an ellipse denoted by $e^p$. Each ellipse $e^p$ is represented by the tuple $(x_i^p, y_i^p, s_i^p, lx_i^p, ly_i^p, \alpha_i^p)$ where $(x_i^p, y_i^p)$ are its center coordinates, $lx_i^p$ is the major axis, $ly_i^p$ is the minor axis and $\alpha_i^p$ is the orientation of the ellipse $e^p$ with respect to the axis of the frame $F_p$. A scale factor $s_i^p$, which depends upon the ratio of ellipse area with respect to total area of the frame, is used to encode bigger regions around MSVs which are very small. A scale factor of 2 means the small MSV is blown up to twice its size, 4 to four times its size, etc.

For the purpose of unique video characterization, an appropriate "fingerprint" needs to capture or encode both the spatial properties of each frame as well as the amount of change in successive frames along the entire length of the video clip. There are two constraints that need to be kept in mind before choosing the appropriate features for the task of video identification:

1) The fingerprint needs to be compact in terms of space in order to reduce the amount of database storage for each video representation and at the same time reduce the amount of time for matching and consequent retrieval of a video from the database.

2) The fingerprint needs to be robust in order to remain invariant to any quality-preserving distortions applied to the video.

Figure 6:
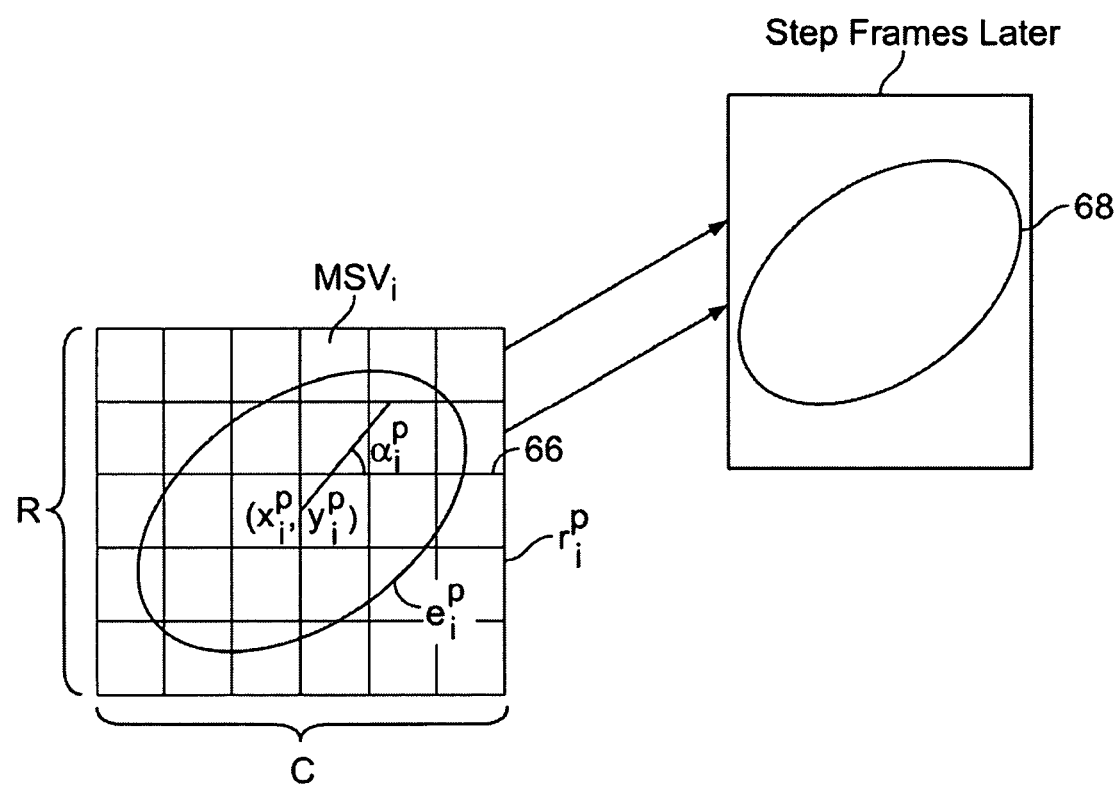
FIG. 6 is a geometric representation of spatio-temporal fingerprints of the present invention encoded as MSV ellipse projections in a video frame.

The present invention fulfills these criteria by expressing each local measurement region of a frame associated with an MSV in the form of a spatio-temporal fingerprint. Referring to FIG. 6, the spatio-temporal fingerprint of the present invention encodes each MSV, detected in the $p^{th}$ video frame $F_p$, is defined as follows:

For an ellipse $e_i^p$ representing the projection of $M_i^p$ onto a frame $F_p$ for a given region of interest $MSV_i$, let $r_i^p$ be a rectangular region that encloses ellipse $e_i^p$ centered at $(x_i^p, y_i^p)$, with an area $(lx_i^p * s_i^p, l_i^p * s_i^p)$ and orientation with respect to the frame axis 66 given by $\alpha_i^p$. (As noted above, since small regions are more prone to perturbations, each region is blown-up by a factor $s_i$)

For a scale invariant fingerprint, the rectangular region $r_i^p$ is divided into R×C blocks.

The Mean luminance of block $(r,c) \epsilon r_i^p$ is denoted by $L_i^p(r,c)$ where $r=[1, \ldots, R]$ and $c=[1, \ldots, C]$. A spatial filter $[-1\ 1]$ and a temporal filter $[-\alpha\ 1]$ is chosen for storing the spatio-temporal dimensions of a video. In order to reduce susceptibility to noise, a fingerprint is computed between $r_i^p$ and $r_i^{p+step}$, which is the same as the region $r_i^p$ but shifted by step frames (ellipse 68).

The Rx(Cx1) bit fingerprint is given by $B_i^p(r,c)$=bit '1' if $Q_p^i(r,c)$ is positive and bit '0' otherwise, where $$Q_p^i(r,c) = (L_i^{p+step}(r,c+1) - L_i^{p+step}(r,c)) - \alpha(L_i^p(r,c+1) - L_i^p(r,c)) \qquad (1)$$

Encoding mean luminance makes the fingerprint of the present invention invariant to photometric distortions.

Figure 7:
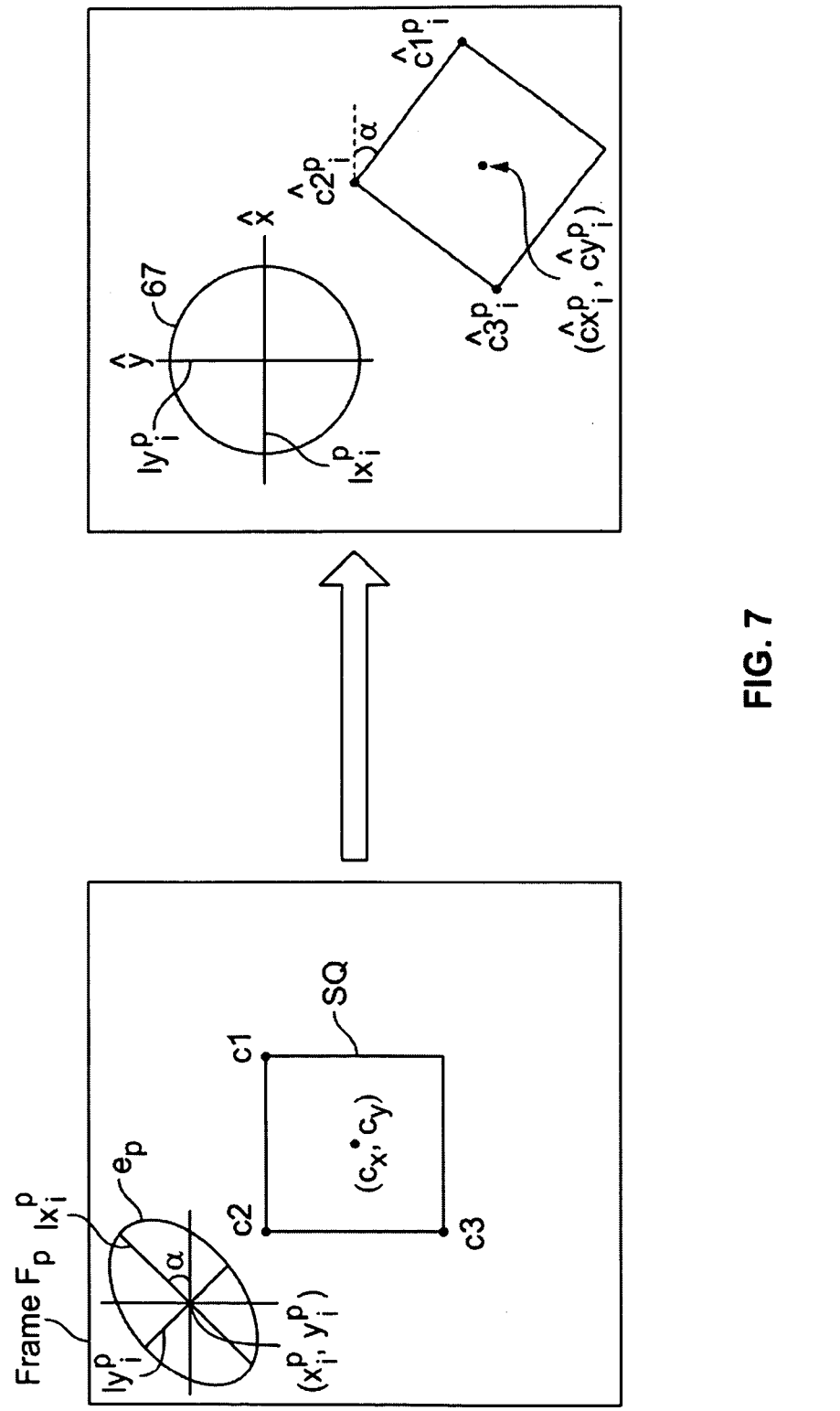
FIG. 7 is a schematic representation of an ellipse representing a fingerprint projected onto a circle in the frame of reference of an MSV with three points chosen and located at corners of a prefixed square SQ enclosing the center of the frame containing the MSV, the center and points of the square being transformed to the reference frame of the MSV.

In a preferred embodiment, localized content of each video frame is stored inside a database look-up table (LUT) using preferably 32-bit fingerprint signatures, as computed in Equation 1. In our database implementation, the LUT consists of $2^{32}$ entries of all possible binary fingerprints. Each such LUT entry in turn stores pointers to all video clips with regions having the same fingerprint value. In order to save an affine invariant representation of the video frame which is independent of different query distortions, the geometric and shape information of ellipse $e_i$ corresponding to region $MSV_i$ is also stored, along with the fingerprint inside the database. Each ellipse corresponding to a fingerprint undergoes three transformations as depicted in FIG. 7, namely by 1) inverse rotation by $\alpha$;
2) translation to a frame center; and
3) warping/scaling down to a unit circle.

These steps are effected by transforming coordinates of the original frame center, denoted by (cx, cy), onto a new reference axis, denoted by $(\hat{X}, \hat{Y})$. The new axis has the property of projecting ellipse $e_i^p$ onto a circle 67, with the ellipse center being the origin of the new reference axis and ellipse major and minor axes aligned with $(\hat{X}, \hat{Y})$ respectively. The coordinates of the original frame center with respect to the new reference axis are denoted by $$(\hat{cx}_i^p, \hat{cy}_i^p).$$

Thus, during insertion, the coordinates of the image center (cx, cy) of the frame $F_p$ are transformed into coordinates $$(\hat{cx}_i^p, \hat{cy}_i^p)$$

in the reference frame of each of the ellipses associated with the maximally stable volumes of the frame $F_p$. The transformation between (cx,cy) and $$(\hat{cx}_i^p, \hat{cy}_i^p)$$

is given by:

$$\hat{cx}_i^p = ((cx - x_i^p)\cos(-\alpha_i^p) - (cy - y_i^p)\sin(-\alpha_i^p))/(lx_i^p \times s_i^p) \quad (2)$$

$$\hat{cy}_i^p = ((cx - x_i^p)\sin(-\alpha_i^p) - (cy - y_i^p)\cos(-\alpha_i^p))/(lx_i^p \times s_i^p) \quad (3)$$

Referring again to FIG. 7, three points are chosen, c1, c2, c3, located at corners of a prefixed square SQ (e.g., of size 100×100 pixels, and hence called "prefix square corner points") centered at (cx, cy). The coordinates of the points c1, c2, c3 with respect to the reference axis $(\hat{X}, \hat{Y})$ are denoted by $$(\hat{c1})_i^p, (\hat{c2})_i^p, (\hat{c3})_i^p.$$

These three points, called the "transformed prefixed square corner points," are stored for their role in the verification step to be described hereinbelow. $f_p$ denotes the gradient-based descriptor of SQ, which is based on the coordinates of the "prefix square corner points."

The representation of all the fingerprints together in the database is expressed as $$\bigcup_p \left( \bigcup_i (B_i^p, \hat{cx}_i^p, \hat{cy}_i^p, e_i^p), f_p \right).$$

Thus, each MSV entry inside the database includes fields for its binary fingerprint $B_i^p$, ellipse parameters $e_i^p$, the coordinates of the frame center with respect to the reference axis $(\hat{X}, \hat{Y})$, the coordinates of "transformed prefixed square corner points," and gradient-based descriptor of SQ given by $f_p$. In a database retrieval, for a query video frame $E^q$, the ellipses and fingerprints of the frame corresponding to the frame's MSVs are generated using Equation 1. Thus, the query frame can be expressed as $\bigcup_j \{B_j^q, e_j^q\}$. Each of the fingerprints of MSVs belonging to the query frame is used to probe the database for potential candidates. That is, the database is queried to get the candidate set given by $$\bigcup_p \left( \bigcup_i (B_i^p, \hat{cx}_i^p, \hat{cy}_i^p, e_i^p), f_p \right).$$

Now there exists a possibility for every entry in the candidate set of being the expected correct database match during database retrieval. Hence, a hypothesis is proposed for the query frame $E^q$, such that the query frame $E^q$ is the same as original frame $F_p$ stored inside the database. This can happen when ellipses $e_j^q$ and $e_i^p$ denote similar regions in their respective frames. For every candidate hit produced from the database, potential matching frames in the database are those whose transformed image centers $\hat{cx}_i^p, \hat{cy}_i^p$, can be inverse transformed to coordinates which closely match the coordinate of the query frame's center. The inverse transformation from a transformed image center $\hat{cx}_i^p, \hat{cy}_i^p$, to the query frame's center are computed by using:

$$\check{cx}_{i,j}^{p,q} = (\hat{cx}_i^p \times s_j^q \times lx_j^{p,q})\cos(\alpha_j^q) - (\hat{cy}_i^p \times s_j^q \times ly_j^q)\sin(\alpha_j^q) \quad (4)$$

$$\check{cy}_{i,j}^{p,q} = (\hat{cx}_i^p \times s_j^q \times lx_j^{p,q})\sin(\alpha_j^q) - (\hat{cy}_i^p \times s_j^q \times ly_j^q)\cos(\alpha_j^q) \quad (5)$$

A score $sc_{i,j,p,q}$ is associated between the MSV of each candidate database frame represented as an ellipse and the query frame defined as:

$$sc_{i,j,p,q} = fac \times (lx_i^p \times ly_i^p \times s_i^p \times s_i^p \div (w \times h)) + (1-fac) \times \log(N \div N_j^q) \quad (6)$$

where N is the total number of entries present in the database and $N_j^q$ is the number of database hits generated for the query fingerprint $B_j^q$. The first term of Equation 6, $(lx_i^p \times ly_i^p \times s_i^p \times s_i^p \div (w \times h))$, signifies that the greater the area represented by the fingerprint of the database image, the higher is the score. Thus, the scoring gives more weight to candidate MSVs of larger size, since these regions encode more information than smaller regions. The second term, $\log(N \div N_j^q)$, assigns higher scores to unique fingerprints $B_j^q$ that produce fewer database hits. Regions with fewer database hits are hence more discriminative. The factor $fac \in [0,1]$ is used for assigning the appropriate weight to each of the two terms in Equation 6. In the preferred embodiment, fac=0.5.

An important requirement of a video fingerprinting system is speed. In cases where a large number of candidate clips are produced as hits from the database, performing an exhaustive check on each one cannot be performed in real time. To meet a real time goal, adopting a strategy to rank-order the local database results in terms of their potential of leading to a correct hit is desirable. For this purpose, an additional stage for scoring each database frame "hit" is employed, followed by a poll to collate all local information and arrive at a final decision.

In an ideal situation, all MSVs within the matching candidate frame will have transformed frame centers $$(\hat{c}x_i^p, \hat{c}y_i^p)$$

and "transformed prefixed square corner points," that map back to the same frame center and "prefix square corner points" which matches query frame center and "prefix square corner points", respectively. In a more realistic scenario with frames subject to distortions, additional processing is necessary via binning. Consider a video as a 3D space with its third dimension given by its frame number. This space is divided into bins (in one preferred embodiment, of size 5×5×10), where each bin is described by a three tuple b≡(b1,b2,b3). Thus, the frames and frame information of database hits are merged (1) which have their hypothetical image centers close to each other, and (2) which belong to neighboring frames of the same video considering that the movements of the region across them is appreciably small.

Figure 8:
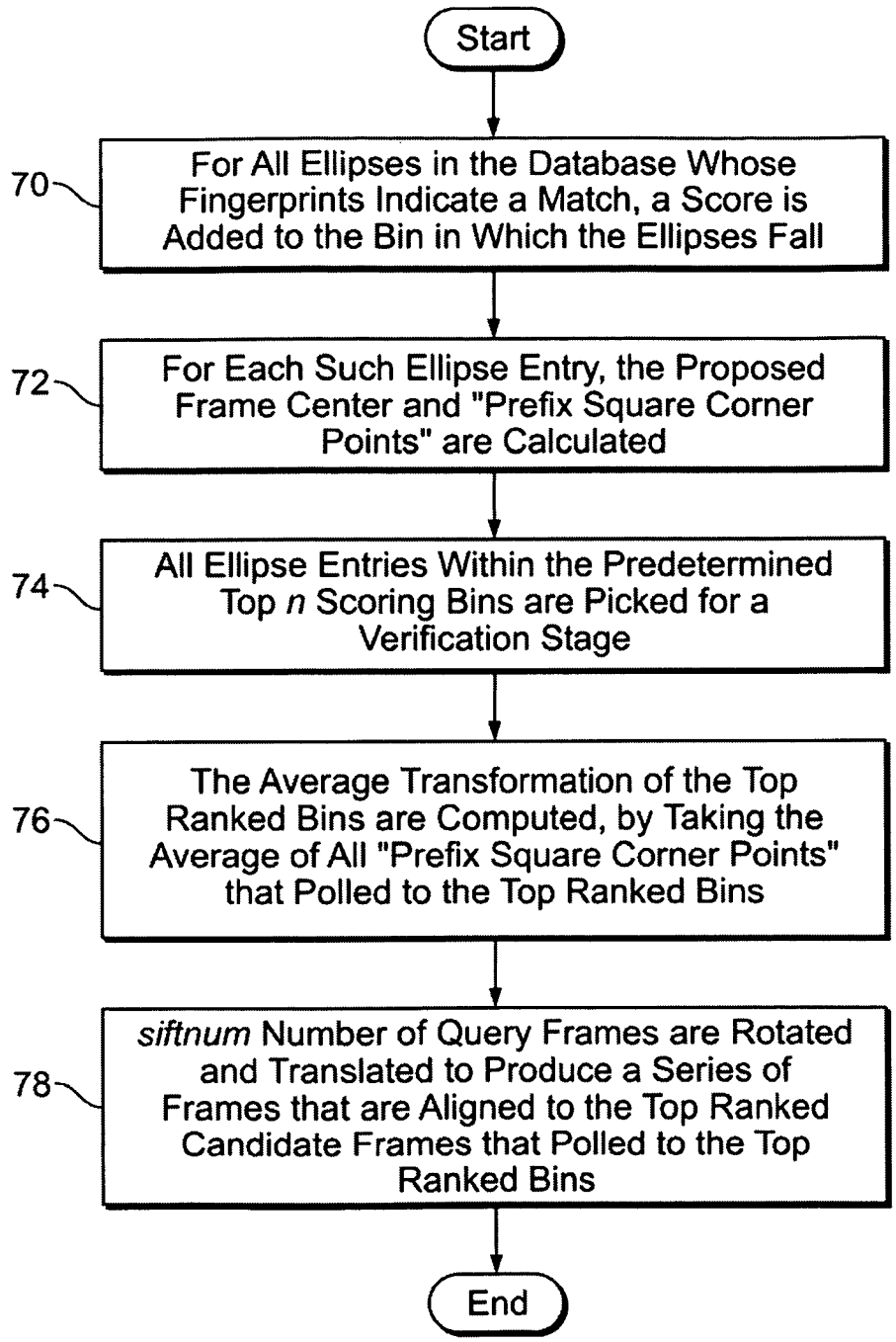
FIG. 8 is a flowchart of the steps of the scoring and polling stage of the present invention for collating and merging candidate fingerprints retrieved from a database and the preparation of a candidate clip for a verification stage of the present invention.

Referring to FIG. 8, the steps of scoring and the preparation of a candidate database frame for the verification stage is as follows: At step 70, for all ellipses $e_j^q$ and $e_i^p$, score $sc_{i,j,p,q}$ is added to the bin in which the database frame's proposed query frame center $$\left(\overset{\vee}{cx}_{i,j}^{p,q}, \overset{\vee}{cy}_{i,j}^{p,q}, q\right)$$

falls. For each such entry, at step 72, $$\overset{\vee}{c1}_{i,j}^{p,q}, \overset{\vee}{c2}_{i,j}^{p,q}, \overset{\vee}{c3}_{i,j}^{p,q},$$

i.e., the database frame's proposed query frame "prefix square corner points" are calculated by using the "transformed prefix square corner points"

$$\hat{c1}_i^p, \hat{c2}^p, \hat{c3}^p$$

and ellipse parameters $e_j^q$ in equations similar to Equations 4 and 5. At step 74, all database frame entries within the predetermined top N scoring bins (by rank ordering the candidate frames) are picked for the next stage of verification to be discussed hereinbelow. Every database hit which polled into a particular bin and added to its score gives information about the affine transformation or homography by which the database frame can be aligned to the query frame. At step 76, the average transformation of bin b is computed, denoted by $H_b$, by taking the average of all proposed "prefix square corner points"

$$\overset{\vee}{c1}_i^p, \overset{\vee}{c2}^p, \overset{\vee}{c3}^p$$

that polled to bin b. At this point, the average proposed prefix square corner points for the highest-polling bins can be reconstructed. At step 78, the inverse of $H_b$, i.e., an affine transformation under which parallel lines remain parallel such as rotation an translation, is applied on siftnum number of query frames viz. $\{E^q, E^{q+1}, \ldots, E^{q+siftnum}\}$ to produce a series of frames $\{E_b^q, E_b^{q+1}, \ldots, E_b^{q+siftnum}\}$. These frames are hypothetically aligned to the ones corresponding to fingerprints stored within the database whose "prefix square corner points" polled to bin b.

Figure 9:
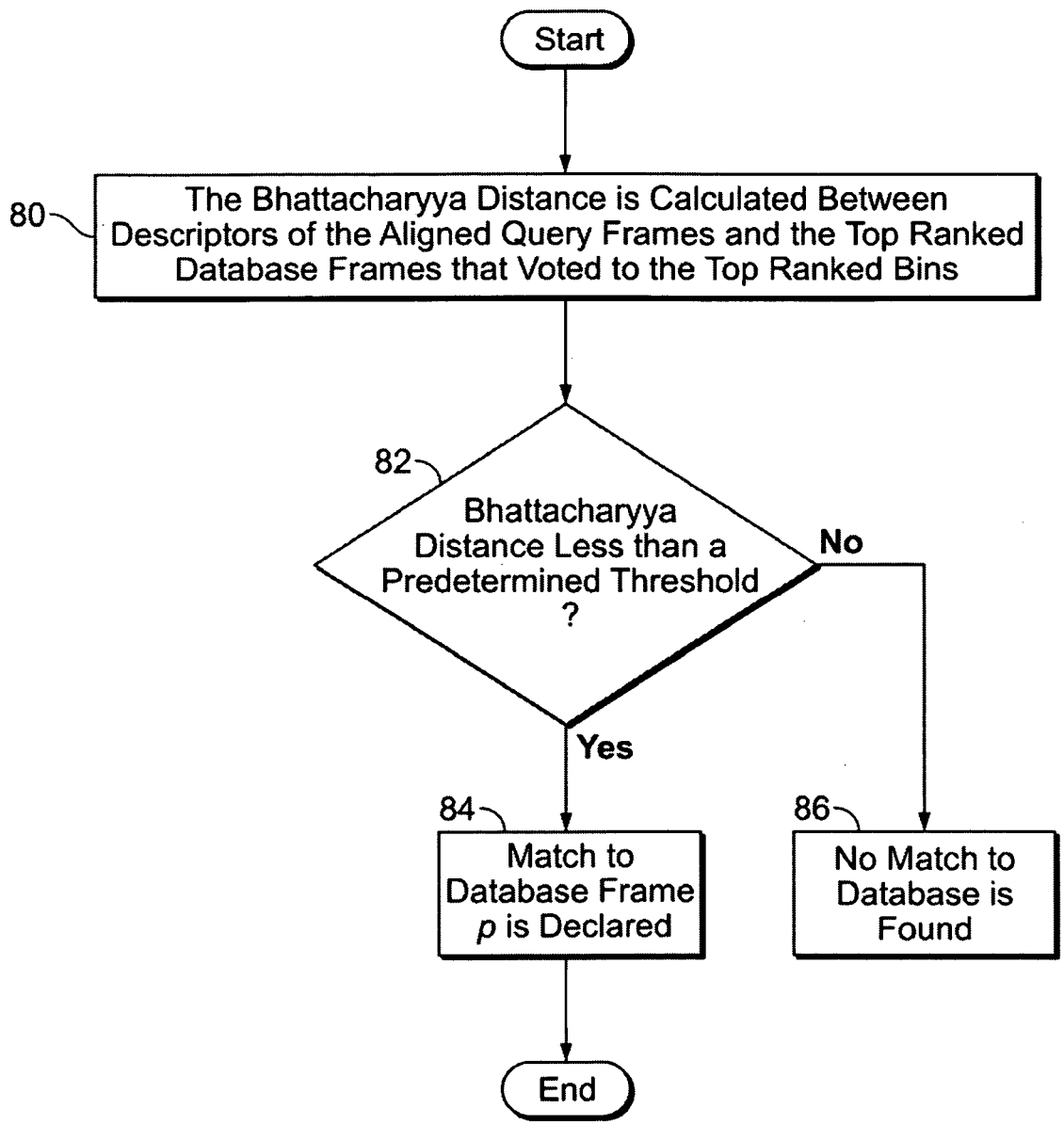
FIG. 9 is a flow chart of the verification stage of the present invention for the declaration of a matching fingerprint/video clip.

Once polling and scoring have completed, from the top si candidates obtained in step 78, the correct database hit is found using a gradient-based descriptor, e.g., a 128 dimension scale invariant feature transformation (SIFT)-based descriptor, in the verification process. Let $esift_b^q$ be the SIFT descriptor of the square $\hat{S}Q$ (e.g., of size 100 by 100 pixels) centered at (cx, cy) in the query frame $E_b^q$ with its sides aligned to the (X,Y) axis of frame $E_b^q$. The verification process, as shown in FIG. 9, is as follows. At step 80, for all database frames that voted to bin b, calculate the Bhattacharyya distance between descriptors of the aligned query $\{esift_b^q, esift_b^{q+1}, \ldots, esift_b^{q+siftnum}\}$ and its database hits $\{sift_p, \ldots, sift_{p+1}, \ldots, sift_{p+siftnum}\}$. In statistics, the Bhattacharyya distance measures the similarity of two discrete probability distributions. For discrete probability distributions p and q over the same domain X, it is defined as BD(p,q):

$$BD(p, q) = -\ln\left(\sum_{x \in X} \sqrt{p(x)q(x)}\right) \quad (7)$$

$$BD(p, q) = -\ln(BC(p, q)) \quad (8)$$

where:

$$BC(p, q) = \sum_{x \in X} \sqrt{p(x)q(x)} \quad (9)$$

is the Bhattacharyya coefficient.

In the equation, p and q are the 128-dimension SIFT descriptors that each describe the region of the square in query and database frames. Substituting $esift_b^q$ and $sift_p$ for p and q in Equation (9), we have $$BC(esift_b^q, sift_p) = \sum_{n=1}^{siftnum} \sum_{x=1}^{128} \sqrt{esift_b^{q+n} * sift_{p+n}} \quad (10)$$

At step 82, if the Bhattacharyya distance is less than an empirically chosen predetermined threshold T (e.g., 0.2) for the database frame p is declared at step 86, otherwise, at step 86, no match is declared to be found.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer-implemented method for matching a video data to a database containing a plurality of video fingerprints, comprising the steps of:
    calculating, using a processor, at least one fingerprint representing at least one query frame from the video data;
    indexing into the database using the at least one calculated fingerprint to find a set of candidate fingerprints;
    applying a score to each of the candidate fingerprints;
    selecting a subset of candidate fingerprints as proposed frames by rank ordering the candidate fingerprints; and attempting to match at least one fingerprint of at least one proposed frame based on a comparison of gradient-based descriptors associated with the at least one query frame and the at least one proposed frame.

2. The method of claim 1, further comprising the step of merging the candidate fingerprints into a plurality of bins.

3. The method of claim 2, wherein the at least one fingerprint representing at least one query frame and the plurality of video fingerprints are based on at least one Maximally Stable Volume (MSV) determined from at least one of the at least one query frame and the proposed frames and the mean luminance of the at least one MSV.

4. The method of claim 3, wherein the candidate fingerprints are represented in the database as:
geometric and shape information associated with an ellipse representing the MSV projected onto a frame in the frame of reference of the MSV;
the coordinates of the center of a proposed frame from which a database frame originates and three points at the corners of a prefixed square enclosing the center (prefix square corner points), the center and the three points having been transformed into the frame of reference of the MSV; and
a gradient-based descriptor based on the prefixed square.

5. The method of claim 4, wherein said step of selecting a subset of candidate fingerprints further comprises the steps of:
inverse transforming the transformed three points to frame of reference of the proposed frame for each of the matching candidate fingerprints;
computing the average inverse transformation of the bins that have the highest N accumulated scores; and
rotating and translating a predetermined number of query frames (siftnum) to produce a series of frames that are aligned to the top ranked proposed frames that polled to the bins that have the highest N accumulated scores.

6. The method of claim 5, wherein the step of attempting to match at least one fingerprint further comprises the steps of:
calculating the Bhattacharyya distance between gradient-based descriptors of the aligned query frames and the top ranked proposed frames for all proposed frames; and
declaring a match to a proposed frame p if the Bhattacharyya distance is less than an empirically chosen predetermined threshold T,
otherwise, declaring that no match is found.

7. The method of claim 1, wherein the step of merging the candidate fingerprints into a plurality of bins further comprises the step of placing candidate fingerprints into divisions of volumes of a 3D space constructed from the length and width of an area covered by the proposed frames, the third dimension of the 3D space being the frame number in a sequence of the proposed frames.

8. The method of claim 1, wherein the score is inversely proportional to the number of frames in the database having a matching fingerprint and directly proportional to the area of a frame represented by the fingerprint.

9. The method of claim 1, further comprising the steps of retrieving the video associated with a matched proposed frame from one of the database containing a plurality of video fingerprints and a remote database.

10. The method of claim 9, wherein the remote database is distributed over the Internet.

11. The method of claim 1, wherein each of the gradient-based descriptors is based on a scale invariant feature transformation (SIFT).

12. An apparatus for matching a video data to a database containing a plurality of video fingerprints, comprising:
a database containing video fingerprints; and
a processor configured for:
calculating at least one fingerprint representing at least one query frame from the video data;
indexing into the database using the at least one calculated fingerprint to find a set of candidate fingerprints;
applying a score to each of the candidate fingerprints;
selecting a subset of candidate fingerprints as proposed frames by rank ordering the candidate fingerprints; and
attempting to match at least one fingerprint of at least one proposed frame based on a comparison of gradient-based descriptors associated with the at least one query frame and the at least one proposed frame.

13. The apparatus of claim 12, wherein the at least one fingerprint representing at least one query frame and the plurality of video fingerprints are based on at least one Maximally Stable Volume (MSV) determined from at least one of the at least one query frame and the proposed frames and the mean luminance of the at least one MSV.

14. A computer-readable medium carrying one or more sequences for matching a video data to a database containing a plurality of video fingerprints, wherein execution of the one of more sequences of instructions by one or more processors causes the one or more processors to perform the steps of:
calculating at least one fingerprint representing at least one query frame from the video data;
indexing into the database using the at least one calculated fingerprint to find a set of candidate fingerprints;
applying a score to each of the candidate fingerprints;
selecting a subset of candidate fingerprints as proposed frames by rank ordering the candidate fingerprints; and
attempting to match at least one fingerprint of at least one proposed frame based on a comparison of gradient-based descriptors associated with the at least one query frame and the at least one proposed frame.

15. The computer readable medium of claim 14, wherein the at least one fingerprint representing at least one query frame and the plurality of video fingerprints are based on at least one Maximally Stable Volume (MSV) determined from at least one of the at least one query frame and the proposed frames and the mean luminance of the at least one MSV.

* * * * *